(12) United States Patent
Kang et al.

(10) Patent No.: US 8,206,023 B2
(45) Date of Patent: Jun. 26, 2012

(54) BACKLIGHT ASSEMBLY AND DISPLAY DEVICE HAVING THE SAME

(75) Inventors: Sang-Min Kang, Cheonon-si (KR); Jun-Hee Son, Cheonon-si (KR); Kyeong-Min Kim, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 471 days.

(21) Appl. No.: 12/584,520

(22) Filed: Sep. 8, 2009

(65) Prior Publication Data

US 2010/0061117 A1 Mar. 11, 2010

(30) Foreign Application Priority Data

Sep. 8, 2008 (KR) .................. 10-2008-0088287

(51) Int. Cl.
*F21V 7/04* (2006.01)
(52) U.S. Cl. .......... 362/632; 362/97.1; 362/614; 349/58
(58) Field of Classification Search .................. 362/97, 362/1, 97.2, 600, 614, 632, 634; 349/58–60, 349/1, 7, 69, 113; 361/681, 684; 439/492
See application file for complete search history.

(56) References Cited

U.S. PATENT DOCUMENTS

| 7,011,443 | B2* | 3/2006 | Chen | 362/633 |
| 7,048,418 | B2* | 5/2006 | Hur et al. | 362/457 |
| 7,116,385 | B2* | 10/2006 | Yeom | 349/58 |
| 7,190,424 | B2* | 3/2007 | Lee et al. | 349/58 |
| 7,717,606 | B2* | 5/2010 | Hsu | 362/633 |
| 7,810,966 | B2* | 10/2010 | Hsu | 362/391 |
| 2002/0034064 | A1* | 3/2002 | Kim | 361/681 |
| 2003/0117544 | A1* | 6/2003 | Kim et al. | 349/58 |
| 2005/0042913 | A1* | 2/2005 | Yu et al. | 439/470 |

* cited by examiner

*Primary Examiner* — Ali Alavi
(74) *Attorney, Agent, or Firm* — Innovation Counsel LLP

(57) ABSTRACT

A backlight assembly and a display device including the backlight assembly are provided for one or more embodiments, where the display device is slim, lightweight, and requires low manufacturing costs because the device integrates a receiving container and a light generating unit cover member. According to an embodiment, the backlight assembly includes a first light generating unit, a wire electrically connected to the first light generating unit, a first fixing member including a groove to fix the first light generating unit and a wire outlet, and a receiving container comprising a light generating unit cover member. The first fixing member includes a protruding portion extending outwardly from the receiving container and the wire outlet formed on the protruding portion.

25 Claims, 12 Drawing Sheets

BACKLIGHT ASSEMBLY AND DISPLAY DEVICE HAVING THE SAME

This application claims priority to and the benefit of Korean Patent Application No. 10-2008-0088287, filed on Sep. 8, 2008, which is incorporated herein by reference in its entirety.

BACKGROUND

1. Technical Field

Embodiments of the present invention relate to a backlight assembly and a display device having the same and, in particular for example, to a backlight assembly and a display device having a light generating unit, a receiving container having a light generating unit cover member, and a fixing member fixing an end portion of the light generating unit.

2. Related Art

Flat panel displays are widely used in products, such as cell phones, monitors, and televisions. The flat panel display, for example a liquid crystal display (LCD), comprises a liquid crystal display panel, a light generating unit, a light guide plate, an optical sheet, a top chassis, and a bottom chassis. The light generating unit generally comprises a lamp, a lamp reflector, and a lamp cover. The LCD device, with a configuration of these elements, is manufactured at an increased cost and complexity.

SUMMARY

The present invention, in accordance with one or more embodiments, provides a backlight assembly and a display device including the backlight assembly, where the display device is slim, lightweight, and requires low manufacturing costs, because the device integrates a receiving container and a light generating unit cover member.

Additional features of embodiments of the present invention are set forth in the description that follows and, in part, is apparent from the description, or may be learned by practice of embodiments of the present invention.

The present invention, in one embodiment, discloses a backlight assembly including a first light generating unit, a wire electrically connected to the first light generating unit, a first fixing member including a groove to fix a first end portion of the first light generating unit and a wire outlet drawing out the wire from the first fixing member, and a receiving container comprising a light generating unit cover member. The first fixing member includes a protruding portion extending outwardly from the receiving container and the wire outlet formed on the protruding portion.

The present invention, in one embodiment, discloses a display device including a display panel, a first lamp including a first electrode at an end portion thereof, a wire electrically connected to the electrode, a lamp holder disposed in the bottom chassis fixing an end portion of the first lamp and guiding the wire, the lamp holder including a protruding portion extending outwardly from the bottom chassis, a wire outlet formed on the protruding portion drawing out the wire from the lamp holder, and a bottom chassis comprising a lamp cover.

It should be understood that both the foregoing general description and the following detailed description are exemplary and explanatory and are intended to provide further explanation of embodiments of the present invention as claimed.

BRIEF DESCRIPTION OF THE DRAWINGS

The above and other aspects, features, and advantages of embodiments of the present invention will become more apparent by describing in detail the exemplary embodiments thereof with reference to the attached drawings in which.

DETAILED DESCRIPTION

Figure 1:
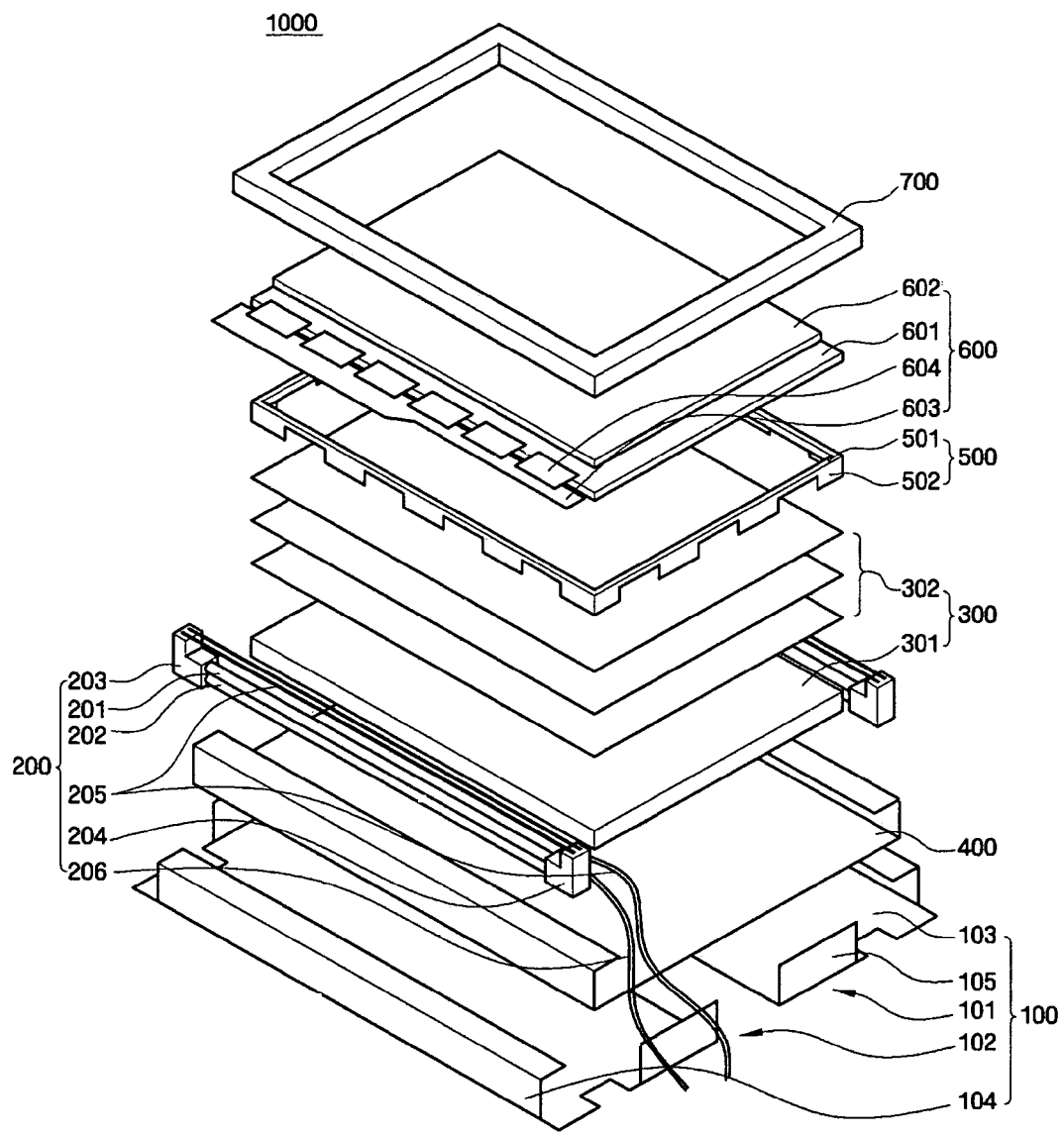
FIG. 1 is an exploded perspective view showing an LCD device, according to an exemplary embodiment of the present invention.

Hereinafter, embodiments of the present invention will be described in detail with reference to the accompanying drawings. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element, it can be directly on, connected or coupled to the other element or layer or intervening elements or layers may be present. Like numbers refer to like elements throughout. As used herein, the term "and/or" includes any and all combinations of one or more of the associated listed items.

It will be understood that, although the terms first, second, third etc. may be used herein to describe various elements, components, regions and/or sections, these elements, components, regions and/or sections should not be limited by these terms. These terms are only used to distinguish one element, component, region or section from another element, component, region or section. Thus, a first element, component, region or section discussed below could be termed a second element, component, region, layer or section without departing from the teachings of the present invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" than other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
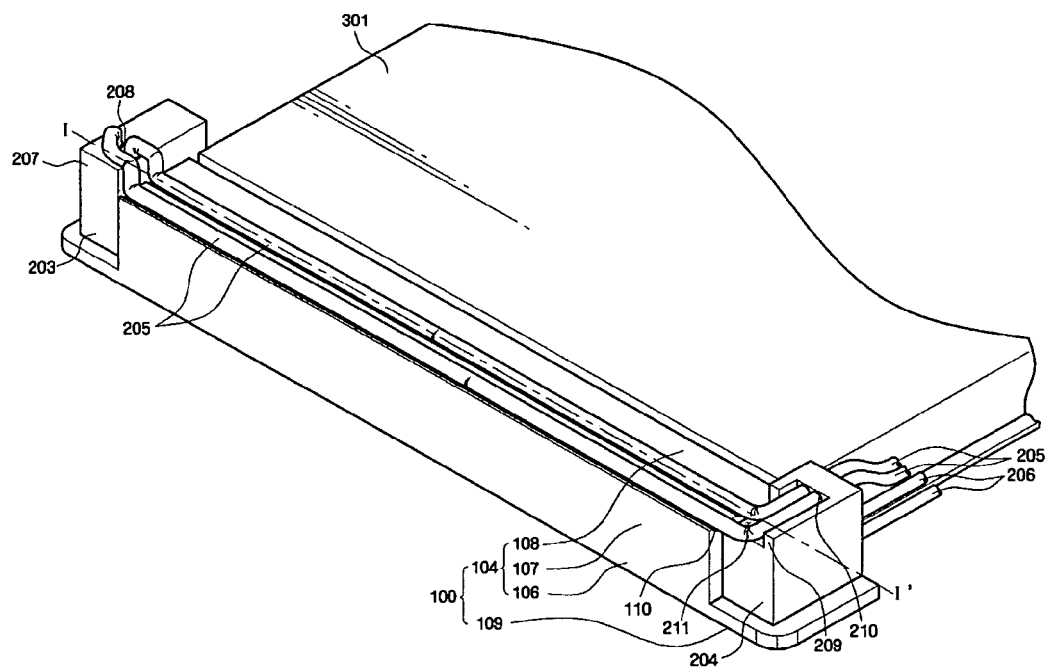
FIG. 2 is a perspective view showing a lamp holder accommodated in a bottom chassis as shown in FIG. 1, according to an embodiment of the present invention.
Figure 3:
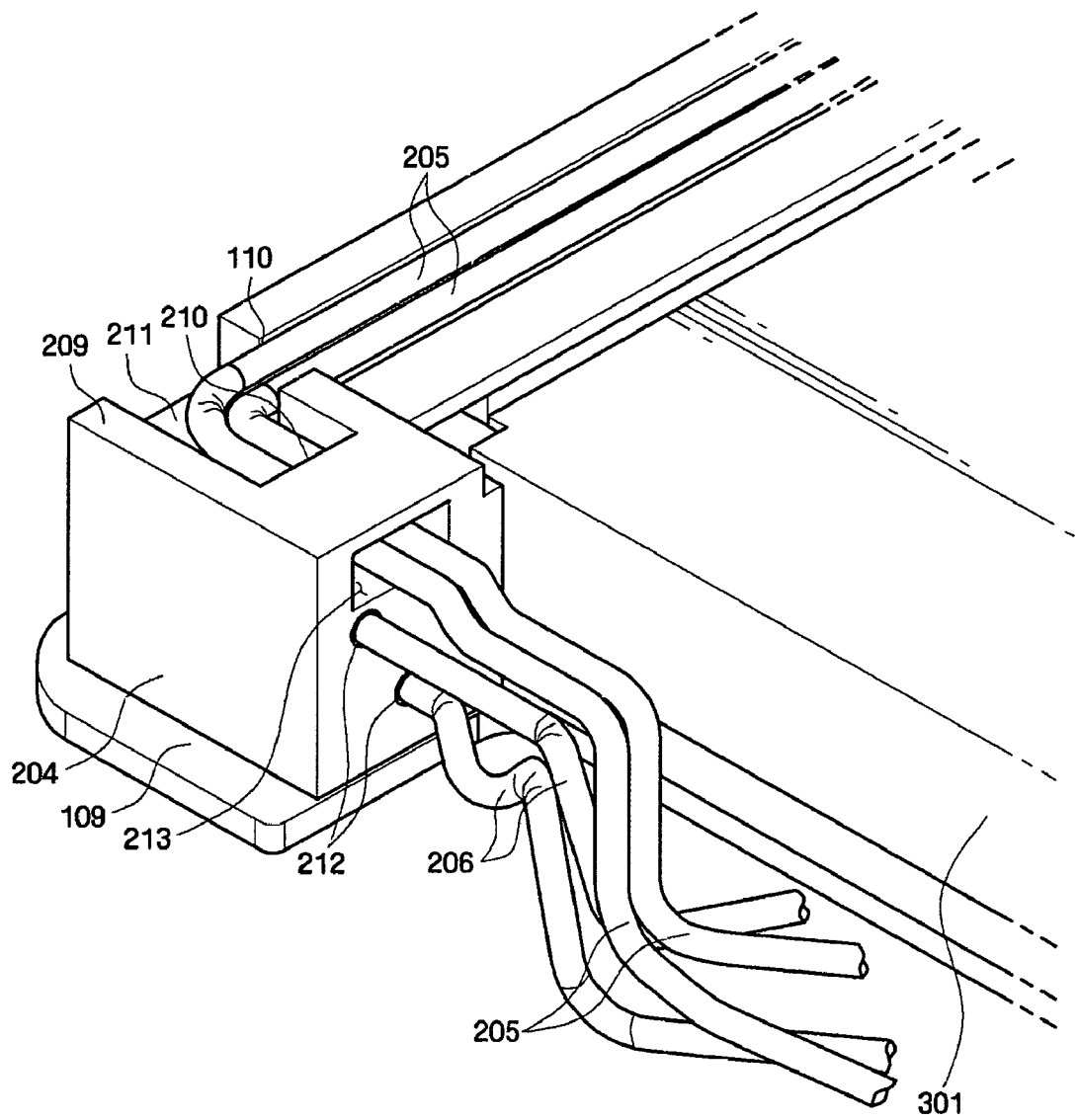
FIG. 3 is a perspective view showing another lamp holder accommodated in a bottom chassis, as shown in FIG. 1, according to an embodiment of the present invention.
Figure 4:
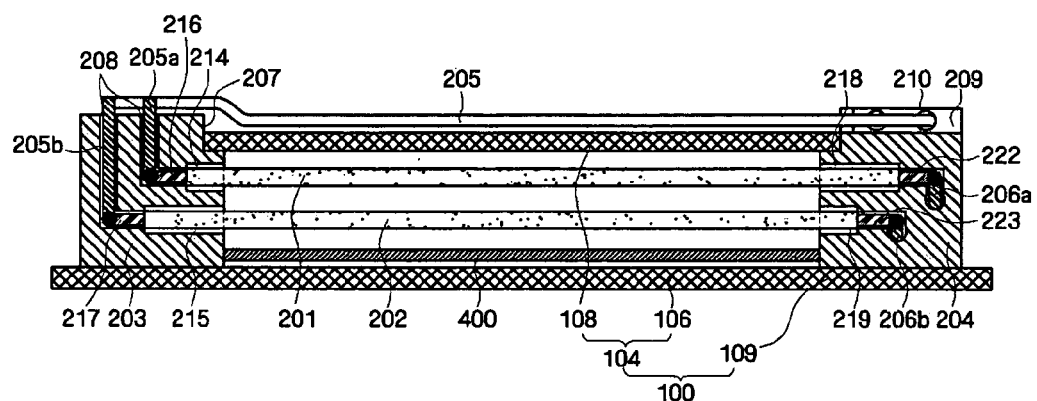
FIG. 4 is a cross-sectional view taken along the line I-I' of FIG. 2, according to an embodiment of the present invention.

FIG. 1 is an exploded perspective view showing an LCD device, according to an exemplary embodiment of the present invention. FIG. 2 is a perspective view showing a lamp holder accommodated in a bottom chassis, as shown in FIG. 1, according to an embodiment of the present invention. FIG. 3 is a perspective view showing another lamp holder accommodated in a bottom chassis, as shown in FIG. 1, according to an embodiment of the present invention. FIG. 4 is a cross-sectional view taken along the line I-I' of FIG. 2, according to an embodiment of the present invention.

Referring to FIG. 1, the LCD device includes an LCD panel 600, a light generating unit 200, a light guiding unit 300, a mold frame 500, a top chassis 700, and a bottom chassis 100. The LCD panel 600 includes a thin film transistor (TFT) substrate 601 and a color filter substrate 602. The LCD panel 600 may include a printed circuit board (PCB) 603 and a flexible printed circuit 604 electrically connecting the PCB 603 to the TFT substrate 601. The PCB 603 generates signals for driving the LCD panel 600, and the flexible printed circuit 604 delivers the signals to the TFT substrate 601. Meanwhile, the PCB 603 and the flexible printed circuit 604 may be substituted by a flexible printed circuit board (FPCB) generating signals to drive the LCD panel 600 and delivering the signals to the TFT substrate 601.

The mold frame 500 receives the LCD panel 600. The mold frame 500 includes a plate 501 having an opening and a plurality of sidewalls 502 extended from the plate 501. The plate 501 may include a groove for fixing the LCD panel 600.

The mold frame 500 is coupled to the bottom chassis 100 to accommodate the light generating unit 200 and the light guiding unit 300. The PCB 603 may be fixed to an outer surface of the sidewall 502.

The light generating unit 200 includes a first lamp 201, a second lamp 202, a first lamp holder 203, a second lamp holder 204, first wires 205, and second wires 206. The light guiding unit 300 includes a light guide plate 301 and a plurality of optical sheets 302. The light guide plate 301 includes a light incident surface receiving light generated from the lamps 201, 202 and a light emitting surface emitting the light to the LCD to the plurality of optical sheets 302. The plurality of optical sheets 302 is disposed over the light guide plate 301 receiving the light emitted from the light guide plate 301, improving the quality of the light such as uniformity and delivering the improved light to the LCD panel 600.

The bottom chassis 100 includes a base plate 103 and a lamp cover 104. The lamp cover 104 is integrally formed with the bottom chassis 100 by extending a portion of the base plate 103 and bending the extended portion of the base plate 103. The bottom chassis 100 including the integrally formed lamp cover 104 simplifies the assembly process, in comparison with a bottom chassis with a separate type lamp cover, and does not require additional parts for coupling the lamp cover to the bottom chassis, such as screws or adhesive tapes. The bottom chassis 100 may be divided into a first bottom chassis 101 and a second bottom chassis 102. In the assembly process of the LCD device, the upper portion of the lamp cover 104 may be blocked during the step of disposing the light generating unit 200 and the light guiding unit 300. The divisional type bottom chassis with the lamp cover integrally formed therewith makes the assembly process easier. The assembly process includes the steps of disposing a light generating unit and a light guiding unit in a first divided bottom chassis and coupling a second divided bottom chassis to the first divided bottom chassis to accommodate the light generating unit and the light guiding unit. The first divided bottom chassis and the second divided bottom chassis may be coupled to each other by an adhesive tape, a fixing member such as a hook integrally formed on the divided bottom chassis or an additional fixing part such as screws. In the assembling process described above, the light generating unit 200 and the light guiding unit 300 is disposed in the first divided bottom chassis before coupling the first and second bottom chassis, so the upper portion of the lamp cover 104 does not block the light generating unit 200 and the light guiding unit 300 during the assembling process.

The bottom chassis 100 may include a plurality of sidewalls 105 extended from the base plate 103 to fix the light guiding unit 300 and develop intensity of the bottom chassis 100. The bottom chassis 100 may include a groove formed on the upper surface of the lamp cover 104. The groove is substantially parallel with the first lamp 201 and accommodates the first wires 205.

A reflective sheet 400 may be disposed on an inner surface of the bottom chassis 100 to reflect the light emitted from the lamp 201, 202 to the inner surface of the lamp cover 104 and the light emitted from the light guide plate 300 to the opposite direction of the LCD panel 600. Meanwhile, the bottom chassis 100 may be made of a material with good reflectivity to develop the reflectivity of the bottom chassis 100. It may be possible to coat the inner surface of the bottom chassis 100 with a reflective material.

The top chassis 700 is disposed over the LCD panel 600 and coupled to the bottom chassis 100. Meanwhile, the top chassis 700 may be coupled to the mold frame 500.

Referring to FIG. 2 and FIG. 3, the first lamp holder 203 fixes end portions of the first and second lamps 202, 203 and guides the first wires 205. The first lamp holder 203 is disposed in an edge portion of the lamp cover 104 and includes a protruding portion 207. The protruding portion 207 is exposed outwardly from the upper surface of the lamp cover 104 and a wire outlet 208 formed on the upper surface of the first lamp holder 203. One end of the first wires 205 are connected to an electrode of the first and second lamp 201, 202 and another end of the first wires 205 are electrically connected to a lamp driving unit providing power to drive the first and second lamp 201, 202. The first wires 205 are passed through the wire outlet 208 and bent to the direction where the second lamp holder 204 is disposed.

The second lamp holder 204, as illustrated in FIG. 3, fixes other end portions of the first and second lamps 201, 202, receiving the first wires 205, and guiding the first wires 205 and the second wires 206. The second lamp holder 204 is disposed in another edge portion of the lamp cover 104 and includes a protruding portion 209. The protruding portion 209 is exposed outwardly from the upper surface of the lamp cover 104. A wire inlet 210 formed on the upper surface of the second lamp holder 204. The upper surface of the second lamp holder 204 may include a wire guiding groove 211 to guide the first wire 205 to the wire inlet 210. A first wire outlet 213 and a second wire outlet 212 are formed on a side surface of the second lamp holder 204. The first wires 205 enter the second lamp holder 204 by the wire inlet 210 and exit from the second lamp holder 204 by the first wire outlet 213. The second wires 206 are connected to another electrode of the first lamp 203 and deliver power provided by the lamp driving unit.

FIG. 4 is a cross-sectional view taken along the line I-I' of FIG. 2, according to an embodiment of the present invention. Referring to FIG. 4, the first lamp holder 203 includes a first lamp fixing groove 214 and a second lamp fixing groove 215. The first lamp fixing groove 214 fixes an end portion of the first lamp 201, and the second lamp fixing groove 215 fixes an end portion of the second lamp 202 disposed below the first lamp 201. The depth of the second lamp fixing groove 215 is deeper than that of the first lamp fixing groove 214, so the end portion of the second lamp 202 enters into the first lamp holder 203 more deeply than the end portion of the first lamp 201. With this structure, the electrode of the first lamp 216, the first wire connected thereto 205a and the end portion of the first lamp does not interfere with the first wire connected to the electrode of the second lamp 205b.

In one aspect, both of the first wires 205a, 205b are passed through the wire outlet 208 formed directly on the upper surface of the first lamp holder 203 without interfering with each other and do not need an additional space for bypassing. Electrodes of the lamp and wires are generally coupled to each other by soldering. If the distance between the solder of each of the lamps gets closer, the possibility of causing a spark will increase. Also, the voltage may exceed the withstanding voltage of the solder because of the interference between the solder of each lamps. According to this exemplary embodiment, the end portion of the second lamp 202 enters into the first lamp holder 203 more deeply than the end portion of the first lamp 201, so the possibility of causing a spark and exceeding the withstanding voltage of the solder will decrease with the extended distance between the solder of the first and the second lamp 201, 202.

The second lamp holder 204 includes a first lamp fixing groove 218, a second lamp fixing groove 219, and the depth of the first lamp fixing groove 218 is deeper than that of the second lamp fixing groove 219. The second wire outlet 212 is formed on a side surface of the second lamp holder 204, so the second wire connected to the electrode of the first lamp 206a and the second wire connected to the electrode of the second lamp 206b do not interfere with each other.

Figure 5:
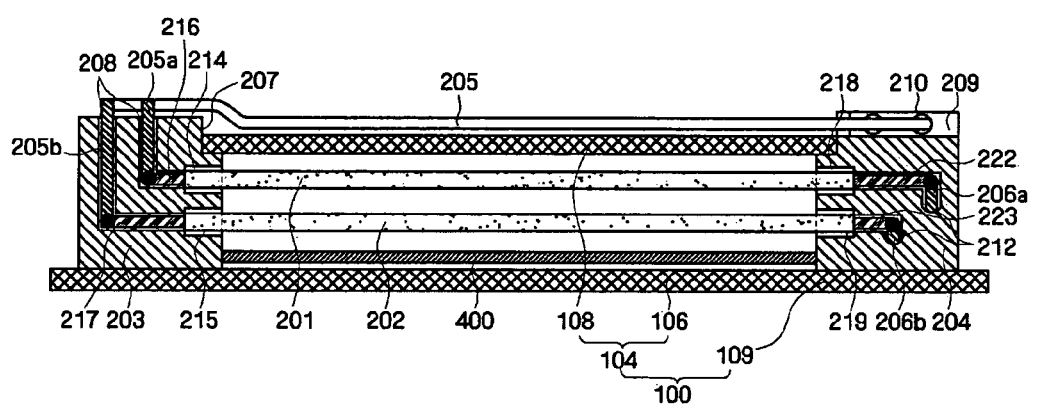
FIG. 5 is a cross-sectional view showing lamps accommodated in a bottom chassis, according to an exemplary embodiment of the present invention.

FIG. 5 is a cross-sectional view showing lamps accommodated in a bottom chassis, according to an exemplary embodiment of the present invention. Referring to FIG. 5, the lamp holder 203 includes a first lamp fixing groove 214 and a second lamp fixing groove 215. The depth of the first lamp fixing groove 214 and the second lamp fixing groove 215 are substantially the same. The electrode of the first lamp 216 is shorter than the electrode of the second lamp 217, so the first wire connected to the electrode of the first lamp 205a, and the first wire connected to the electrode of the second lamp 205b, do not interfere with each other.

Figure 6:
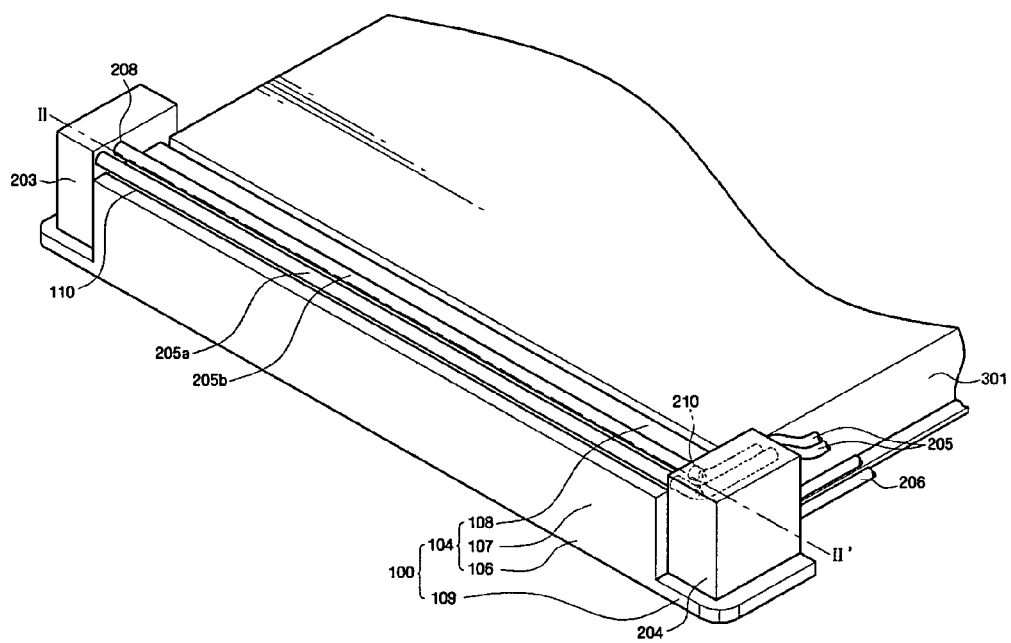
FIG. 6 is a perspective view showing a lamp holder accommodated in a bottom chassis, according to an exemplary embodiment of the present invention.
Figure 7:
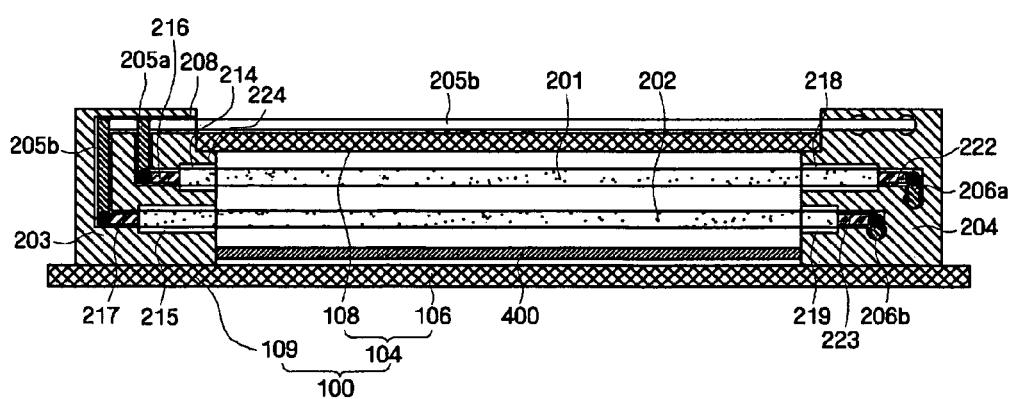
FIG. 7 is a cross-sectional view taken along the line II-II', according to an embodiment of the present invention.

FIG. 6 is a perspective view showing a lamp holder accommodated in a bottom chassis, according to an exemplary embodiment of the present invention. FIG. 7 is a cross-sectional view taken along the line II-II', according to an embodiment of the present invention.

Referring to FIG. 6 and FIG. 7, a lamp cover 104 is integrally formed with a bottom chassis 100. The lamp cover 104 includes a bottom portion 106, a first bending portion 107, and a second bending portion 108. The bottom portion 106 includes an exposed portion 109. The exposed portion 109 does not overlap with the second bending portion 108. A lamp holder 203 is disposed on an edge of the bottom portion, and at least a portion of the lamp holder 203 overlaps with the exposed portion 109. The lamp holder includes lamp fixing grooves 214, 215 and wire outlets 208. The lamp fixing grooves 214, 215 and the wire outlets 208 face the same direction. First wires 205 are connected to electrodes of the first and second lamps 216, 217 and pass through the wire outlets 208. The thickness of the lamp holder 203 is larger than that of the lamp cover 104. More specifically, the thickness of the lamp holder 203 is larger than the sum of the thickness of the lamp cover and the diameter of the first wires 205.

The wire outlets 208 are formed on an area of the side surface above the second bending portion 108 to prevent the first wires 205 from being damaged by the sharp edge of the second bending portion 108. The lamp holder includes a coupling portion 224 contacting the bottom portion 106, the first bending portion 107, and the second bending portion 108. According to this exemplary embodiment of the present invention, the first wires 205 do not require an additional bending portion after passing through the wire outlet 208, because the wire outlet 208 aims in a direction where the first wires extend.

Figure 8:
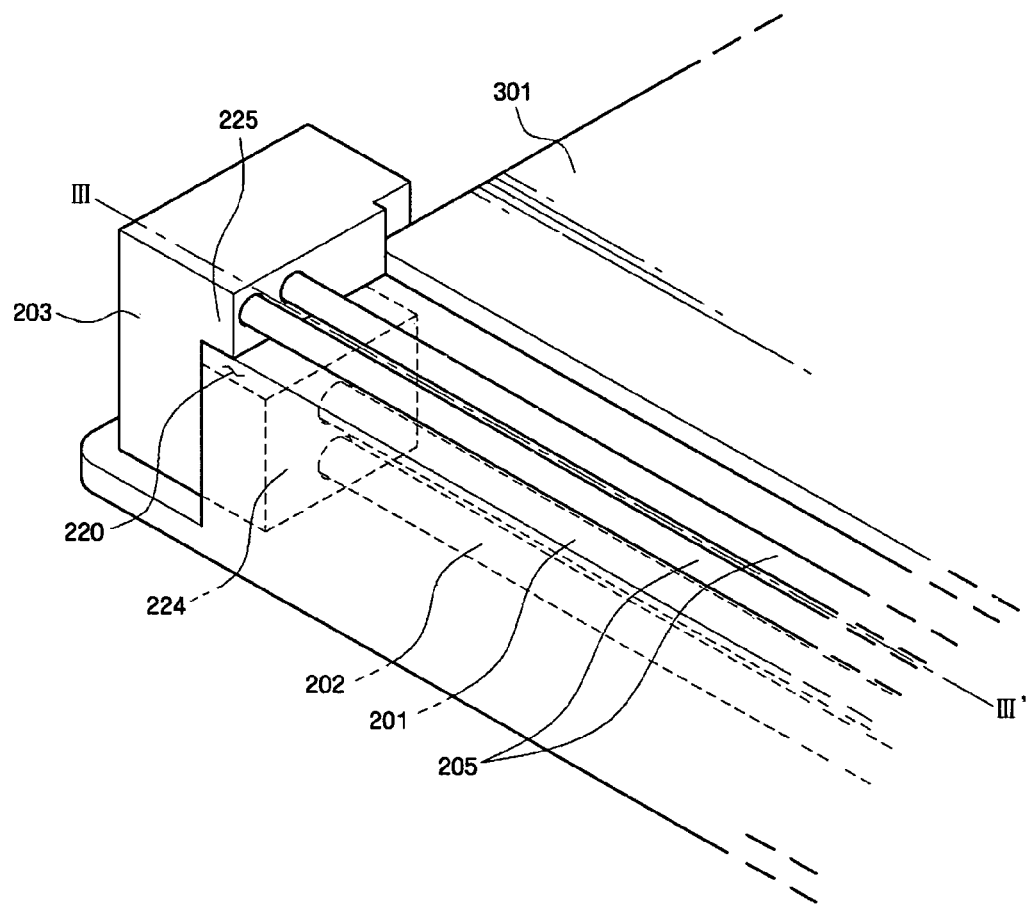
FIG. 8 is a perspective view showing a lamp holder accommodated in a bottom chassis, according to an exemplary embodiment of the present invention.
Figure 9:
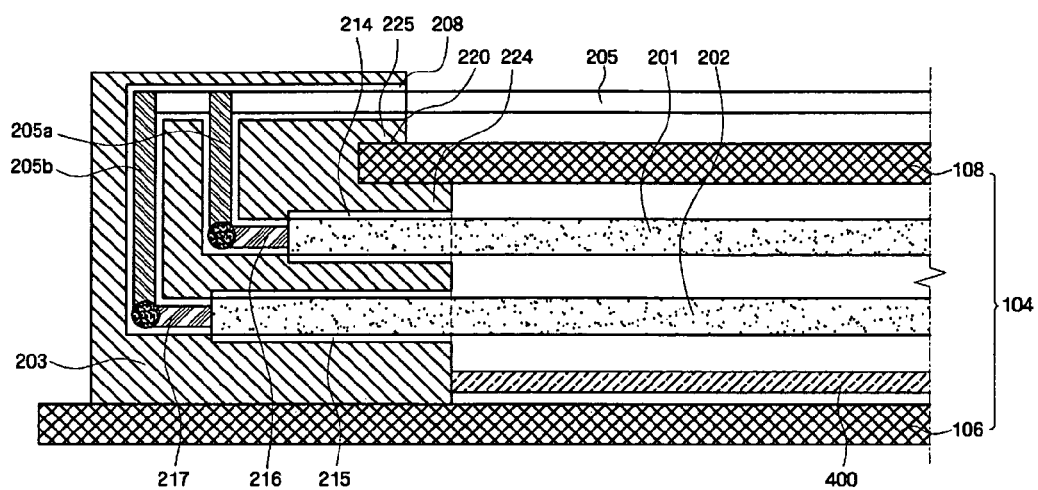
FIG. 9 is a cross-sectional view taken along the line III-III', according to an embodiment of the present invention.

FIG. 8 is a perspective view showing a lamp holder accommodated in a bottom chassis, according to an exemplary embodiment of the present invention. FIG. 9 is a cross-sectional view taken along the line III-III', according to an embodiment of the present invention.

Referring to FIG. 8 and FIG. 9, a groove 220 is formed on an inner surface of the lamp holder. The groove 220 is disposed on an area between a lamp fixing portion including lamp fixing grooves 214, 215 and a wire guiding portion including wire outlets 208. With this embodiment, a first wire 205 is not damaged by a sharp edge of the lamp cover 104 after passing through the lamp holder 203. The lamp holder 203 is also coupled to the lamp cover 104 more stably.

Figure 10:
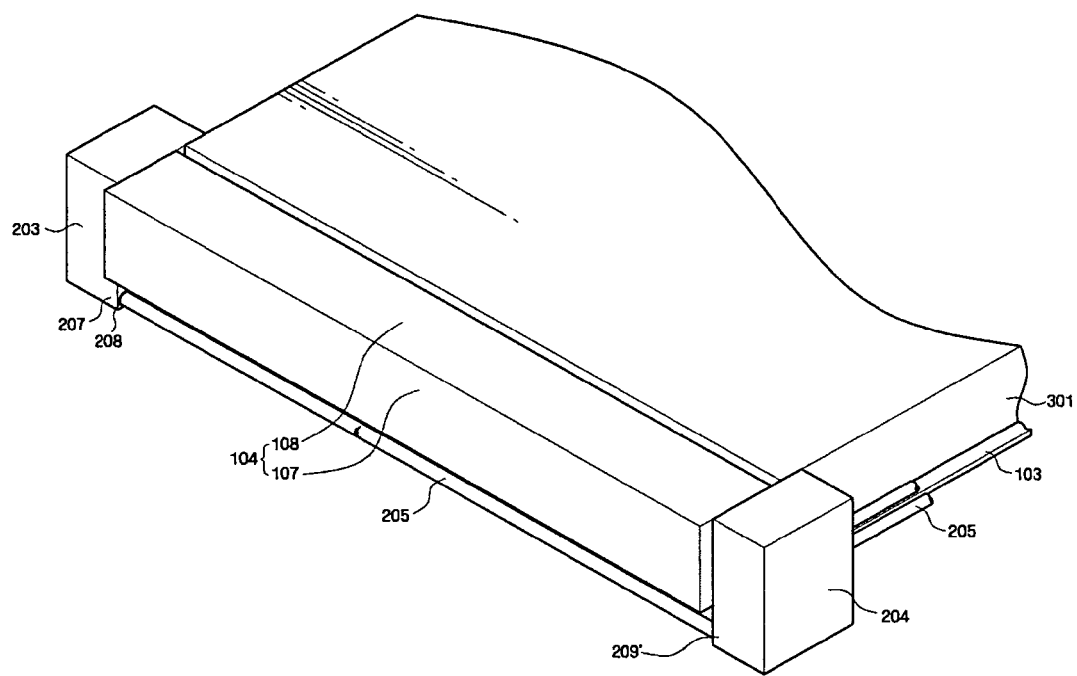
FIG. 10 is a perspective view showing a lamp holder accommodated in a bottom chassis, according to an embodiment of the present invention.
Figure 11:
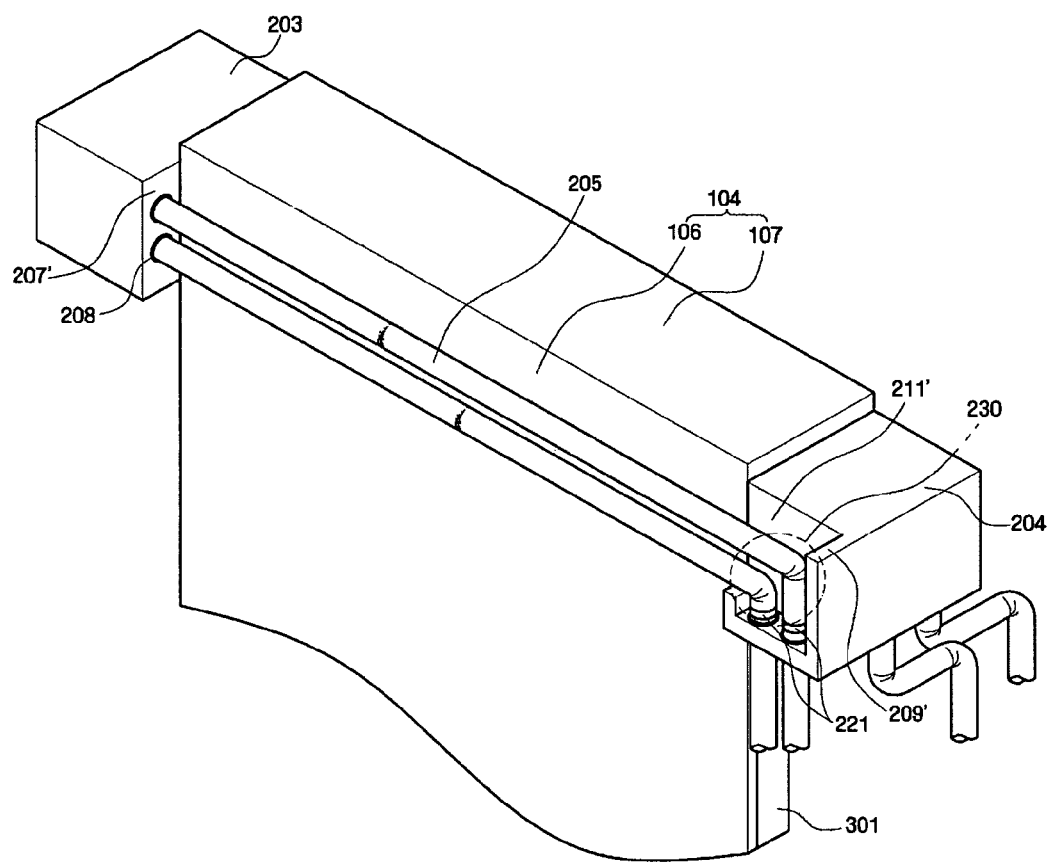
FIG. 11 is a perspective view showing the lamp holder accommodated in a bottom chassis, according to the exemplary embodiment of the present invention, as shown in FIG. 10, e.g., in another angle.

FIG. 10 is a perspective view showing a lamp holder accommodated in a bottom chassis, according to an exemplary embodiment of the present invention. FIG. 11 is a perspective showing the lamp holder accommodated in a bottom chassis, according to the exemplary embodiment of the present invention, for example as shown in FIG. 10, in another angle.

Referring to FIG. 10 and FIG. 11, a lamp holder 203 includes a protruding portion 207 exposed outwardly from a lower surface of bottom chassis 100. A wire outlet 208 is formed on a lower surface of the lamp holder 203. Another lamp holder 204 also includes a protruding portion 209 exposed outwardly from the lower surface of the bottom chassis 100. The lamp holder 204 includes a through hole and a wire guide groove 211. An adhesive tape 221 is attached to the first wires 205 and the wire guide groove 211 to fix the first wires 205 to the wire guide groove 211 more stably. In one aspect, the wire guide groove 211 fixes and protects a bending portion of the first wires 230.

Figure 12:
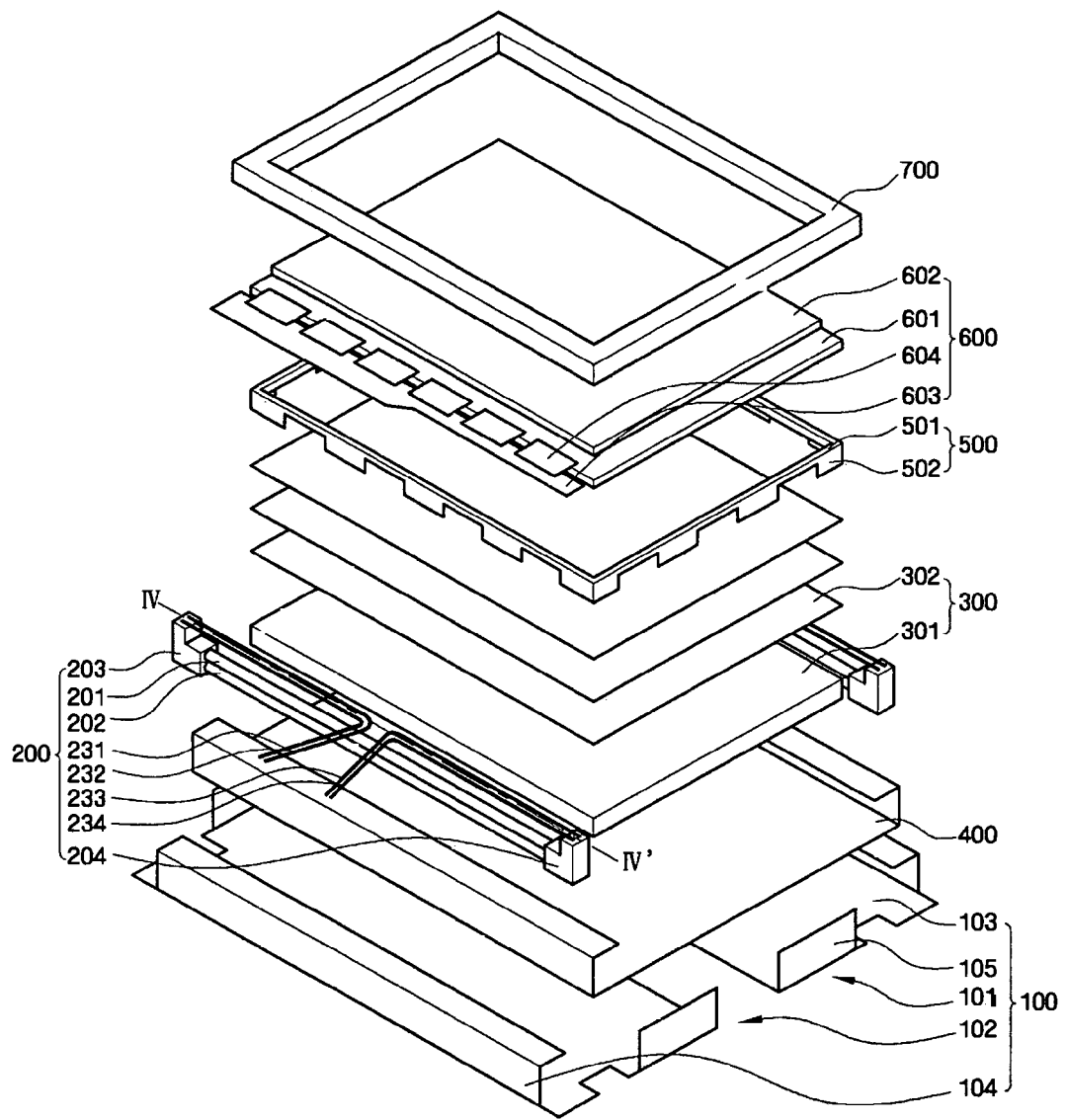
FIG. 12 is an exploded perspective view showing an LCD device, according to an exemplary embodiment of the present invention.
Figure 13:
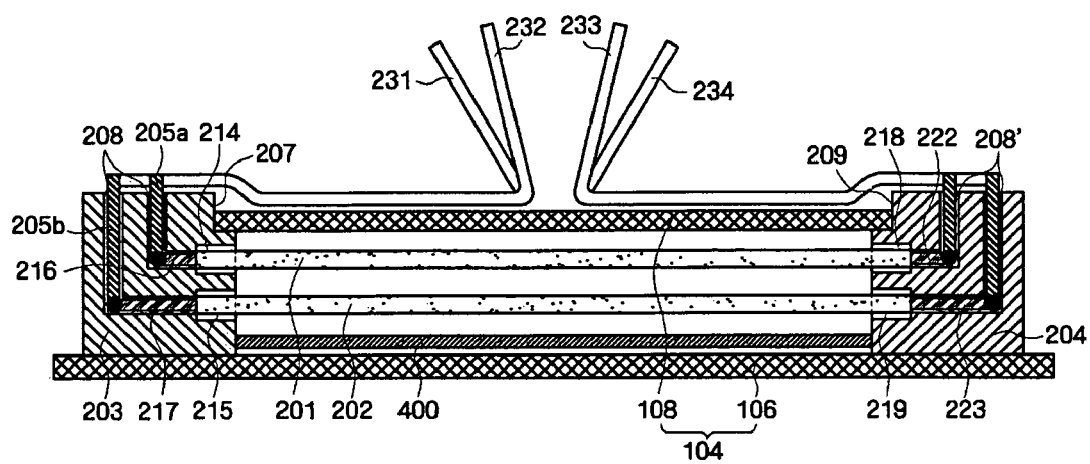
FIG. 13 is a cross-sectional view taken along the line IV-IV', according to an embodiment of the present invention.

FIG. 12 is an exploded perspective view showing an LCD device, according to an exemplary embodiment of the present invention. FIG. 13 is a cross-sectional view taken along the line IV-IV', according to an embodiment of the present invention.

Referring to FIG. 12, a first lamp holder 203 fixes end portions of the first and second lamps 201, 202 and guides wires 231, 232 connected to corresponding ends of the first lamp 201 and the second lamp 202. The first lamp holder 203 including a protruding portion 207 is disposed on an edge of the lamp cover 104. The protruding portion 207 is exposed outwardly from the upper surface of the lamp cover 104 and a wire outlet 208 formed on the upper surface of the first lamp holder 203.

A second lamp holder 204 fixes other end portions of the first and second lamps 201,202 and guides wires 233,234 connected to corresponding ends of the first lamp 201 and the second lamp 202. The second lamp holder 204 includes a protruding portion exposed outwardly from the upper surface of the lamp cover 104 and a wire outlet formed on the upper surface of the second lamp holder 204.

The wires 231, 232, 233, 234, guided and passed through the first and second lamp holder 203, 204, are extended from the first and second lamp holder 203, 204 and are substantially parallel with the first and second lamps 201, 202. The wires 231, 232, 233, 234 meet in the upper surface of a lamp cover 104 and bend outwardly to be connected to a lamp driving unit providing power for driving the first and second lamps 201,202.

Referring to FIG. 13, the first and second lamp holders 203, 204 include a first lamp fixing groove 214, 218 and a second lamp fixing groove 215, 219. The depth of the first lamp fixing groove 214, 218 and the second lamp fixing groove 215, 219 are substantially the same. The electrodes of the first lamp 216, 222 are shorter than the electrodes of the second lamp 217, 223, so the wires connected to the electrodes of the first lamp 231, 233 and the wires connected to the electrodes of the second lamp 232, 234 do not interfere with each other.

Figure 14:
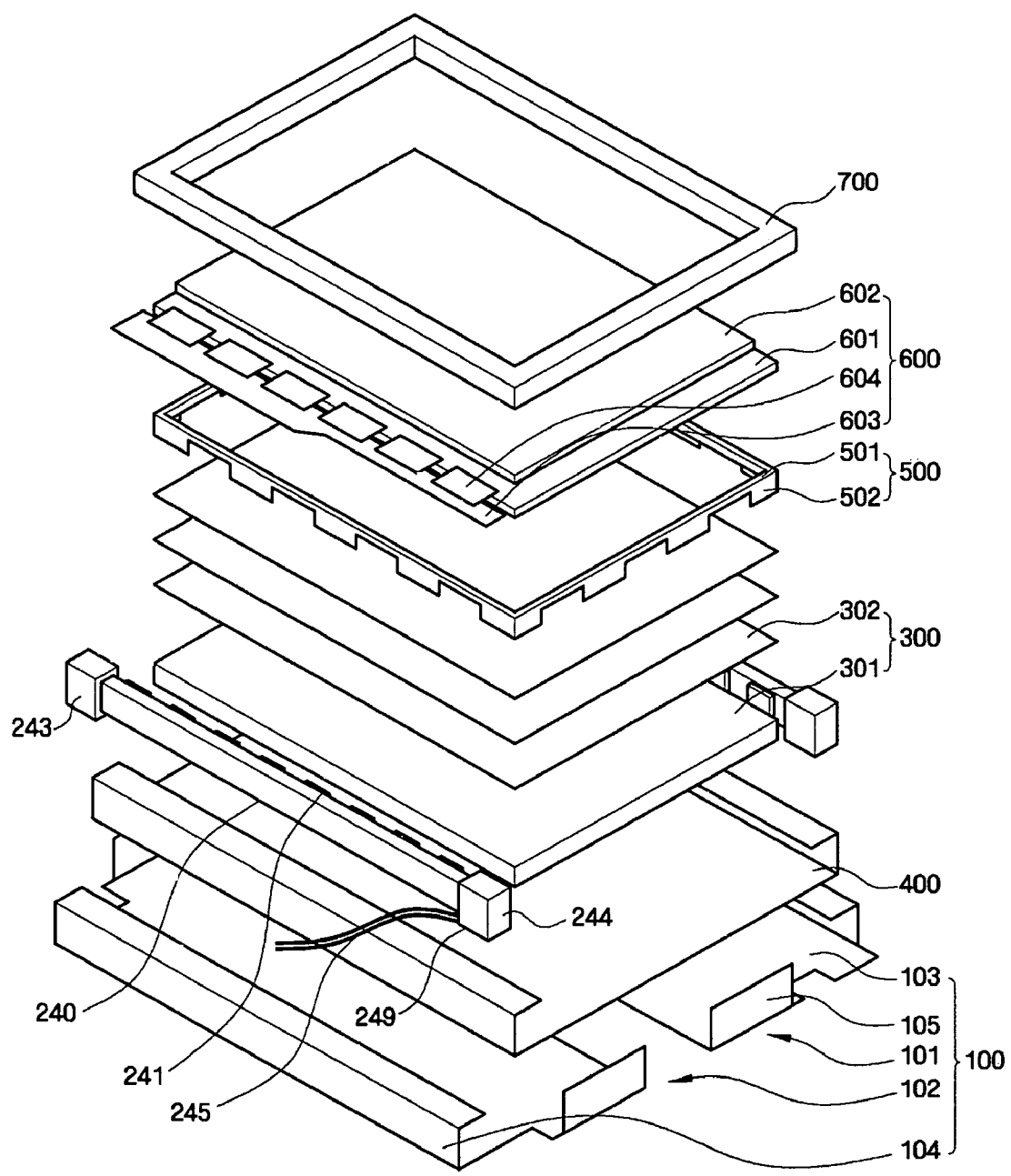
FIG. 14 is an exploded perspective view showing a backlight assembly, according to an exemplary embodiment of the present invention.

FIG. 14 is an exploded perspective view showing a backlight assembly, according to an exemplary embodiment of the present invention. Referring to FIG. 14, a board 240 including a plurality of light emitting diodes (LEDs) 241 mounted on a surface thereof is illustrated. The LEDs 241 face a light incident surface of a light guide plate 301. First and second holder 243, 244 are disposed in the bottom chassis 100 and fix each end portion of the board 240. Wires 245 are connected to the board 240 and a driving unit providing power for driving the LEDs 241. The wires 245 electrically connect the board 240 to the driving unit and deliver power to provide by a driving unit. The first holder 243 includes a groove for fixing one end of the board 240. The second holder 244 includes a groove for fixing another end of the board 240 and a wire outlet for guiding the wires 245. The wire outlet is formed on a protruding portion of the second holder 244. The protruding portion is exposed outwardly from the lower surface of the bottom chassis 100.

Although embodiments of the present invention have been described with reference to the accompanying drawings and the exemplary embodiments, the present invention is not limited thereto, but is defined by the appended claims.

Therefore, it should be noted that various changes and modifications may be made by those skilled in the art without departing from the technical spirit and scope of the appended claims.

What is claimed is:

1. A backlight assembly comprising:
a first light generating unit comprising a first end portion and a second end portion;
a wire connected to the first end portion of the first light generating unit and adapted to provide electrical power to the first light generating unit;
a first fixing member fixing the first end portion of the first light generating unit; and
a receiving container comprising a light generating unit cover member, wherein the light generating unit cover member comprises at least two bent portions to enclose the first light generating unit, and wherein the receiving container is adapted to accommodate the first light generating unit and the fixing member,
wherein the first fixing member comprises a first groove to fix the first end portion of the first light generating unit, a protruding portion extending outwardly from the receiving container, and a wire outlet on the protruding portion, wherein the wire from the first fixing member passes through the wire outlet.

2. The backlight assembly of claim 1, wherein the protruding portion extends from an upper surface of the light generating unit cover member.

3. The backlight assembly of claim 2, wherein the wire comprises a portion substantially parallel to the first light generating unit and contacting an upper surface of the light generating unit cover member.

4. The backlight assembly of claim 3, wherein the upper surface of the light generating unit cover member comprises a groove substantially parallel to the first light generating unit to fix the wire.

5. The backlight assembly of claim 3, further comprising a mold frame disposed over the receiving container and adapted to receive the receiving container,
wherein a lower surface of the mold frame comprises a depressed portion to receive the portion of the wire substantially parallel to the first light generating unit.

6. The backlight assembly of claim 2, wherein the wire outlet is formed on an upper surface of the first fixing member.

7. The backlight assembly of claim 6, wherein the wire outlet further comprises a wire guiding groove formed on the upper surface of the first fixing member.

8. The backlight assembly of claim 7, wherein an adhesive member is disposed between the wire and the wire guiding groove to fix the wire to the wire guiding groove.

9. The backlight assembly of claim 2, wherein the wire outlet and the first groove are facing a same direction.

10. The backlight assembly of claim 1, wherein the protruding portion extends from a lower surface of the light generating unit cover member.

11. The backlight assembly of claim 10, wherein the wire outlet is formed on a lower surface of the first fixing member.

12. The backlight assembly of claim 10, wherein the wire outlet and the first groove are facing a same direction.

13. The backlight assembly of claim 1, further comprising a reflective sheet covering an inner surface of the receiving container and the light generating unit cover member.

14. The backlight assembly of claim 1, further comprising a second light generating unit disposed in the light generating unit cover member.

15. The backlight assembly of claim 14, wherein the first fixing member further comprises a second groove to fix a first end portion of the second light generating unit, wherein a depth of the first groove is deeper than a depth of the second groove.

16. The backlight assembly of claim 1, wherein the receiving container is divided into a first receiving container and a second receiving container, and wherein the first receiving container is separable from the second receiving container and the first receiving container comprises the light generating unit cover member.

17. The backlight assembly of claim 1, further comprising a second fixing member fixing the second end portion of the first light generating unit, wherein the second fixing member comprises a protruding portion extending outwardly from the receiving container and a wire inlet formed on said protruding portion, and wherein the wire inlet receives a portion of the wire connected to the first end portion of the first light generating unit.

18. The backlight assembly of claim 17, wherein the second fixing member further comprises a first wire outlet and a second wire outlet, wherein the wire connected to the first end portion of the first light generating unit passes through the first wire outlet, and a wire connected to the second end portion of the first light generating unit passes through the second wire outlet, wherein the first wire outlet and the second wire outlet are facing a same direction.

19. A display device comprising:
a display panel;
a first lamp comprising a first electrode at an end portion thereof;
a wire connected to the first electrode and adapted to supply electrical power to the first lamp;
a light guide plate adapted to guide light emitted from the first lamp toward the display panel;
an optical sheet located on an upper portion of the light guide plate;
a bottom chassis comprising a base plate and a lamp cover, wherein the lamp cover comprises at least two bent portions to enclose the first lamp, and wherein the bottom chassis is adapted to accommodate the first lamp, the light guide plate and the optical sheet;
a mold frame disposed over the bottom chassis and adapted to receive the display panel;
a lamp holder disposed in the bottom chassis adapted to fix the end portion of the first lamp and to guide the wire, wherein the lamp holder comprises a protruding portion extending outwardly from the bottom chassis; and
a wire outlet formed on the protruding portion, wherein the wire from the lamp holder passes through the wire outlet.

20. The display device of claim 19, further comprising a second lamp, wherein the second lamp comprises a second electrode at an end portion thereof disposed in the lamp cover, wherein the second lamp is substantially parallel with the first lamp.

21. The display device of claim 20, wherein the end portion of the second lamp is shifted from the corresponding end portion of the first lamp by a predetermined distance.

22. The display device of claim 20, wherein the second electrode is longer than the first electrode.

23. The display device of claim 19, further comprising a reflective sheet covering an inner surface of the base plate and the lamp cover.

24. The display device of claim 19, wherein the bottom chassis is divided into a first chassis and a second chassis, and wherein the first chassis is separable from the second chassis and the first chassis comprises the lamp cover.

25. The display device of claim 24, further comprising a top chassis disposed over the display panel and coupled to the bottom chassis.

* * * * *